United States Patent [19]

Nicoli

[11] 4,174,630
[45] Nov. 20, 1979

[54] ULTRASONIC ANEMOMETER

[75] Inventor: Jacques A. G. Nicoli, Paris, France

[73] Assignee: Societe d'Exploitation de Produits et de Techniques pour l'Aeronautique et l'Automatique, Paris, France

[21] Appl. No.: 848,232

[22] Filed: Nov. 3, 1977

[51] Int. Cl.² .......................... G01P 5/00; G01F 1/66
[52] U.S. Cl. ...................................... 73/194 A; 73/189
[58] Field of Search ....................... 73/194 A, 189, 181

[56] References Cited

U.S. PATENT DOCUMENTS

| | | | |
|---|---|---|---|
| 3,861,211 | 1/1975 | Dewan | 73/170 A X |
| 3,978,726 | 9/1976 | Shih | 73/194 A X |
| 4,031,756 | 6/1977 | Rotier et al. | 73/189 |
| 4,038,870 | 8/1977 | Rotier | 73/189 X |
| 4,112,756 | 9/1978 | MacLennan et al. | 73/181 |

Primary Examiner—Charles A. Ruehl
Attorney, Agent, or Firm—Mason, Kolehmainen, Rathburn & Wyss

[57] ABSTRACT

An ultrasonic anemometer wherein there is a fixed supporting framework, transmitter-receiver piezoelectric transducers spaced a predetermined distance apart and making known angles between them, a generator of ultrasonic waves to excite said transmitters, each receiver being connected to an impedance matching circuit, a phasemeter and display means, the phasemeters relating to the various receivers being connected to a computer.

14 Claims, 7 Drawing Figures

ULTRASONIC ANEMOMETER

The invention provides an ultrasonic anemometer.

The means suggested to date to perform such a measurement utilize measurements of phases or time of propagation of acoustic waves, but no static solution has been suggested which compensates for variations in the physical characteristics of the medium of propagation when measurement is performed in a non-confined medium.

Other apparatus utilizing the Doppler effect in a confined medium, cannot measure the speed of the wind as well as take into account the conditions of the local propagation.

The aim of the present invention is to solve said problems by means of a simple and static system and is aimed by way of a non-limitative subject-matter to measure the speed and direction of the wind in a non-confined medium.

In order to provide an ultrasonic anemometer there is a fixed supporting framework, three pairs of transmitter-receiver transducers are located at predetermined distances from each other along three axes making a known angle between them, an ultrasonic wave generator for the excitation of the transmitters of said pairs, each of said receivers being connected to an impedance matching circuit, a phasemeter and display means, the phasemeters relating to the various receivers being connected with a computer.

According to a further characteristic of the present invention, the three pairs of transmitter-receiver transducers form a rectangular tetrahedron.

According to another characteristic feature of the invention, so as to remove the influence of the variations in temperature and any other physical parameters, there is a fourth pair of transmitter-receiver transducers located at a predetermined distance from the others at the trisectrix of said rectangular tetrahedron.

According to a further characteristic feature of the invention, the supporting framework consists of three rings defining a sphere, the planes defined by said three rings being mutually perpendicular to one another. The transmitter-receiver transducer pairs being positioned diametrally opposite to each other on said rings.

The invention is presented by way of non-limitative example in the attached drawings, wherein.

Accordingly, the aim of the invention is to simultaneously measuring the phase difference between the transmission and reception of a harmonic acoustic wave in four distinct directions in the space. In the system disclosed by way of non-limitative example, three of the directions form a rectangular tetrahedron, and the fourth of them being the apex of the tetrahedron. The measurement of the total phase difference and the processing of these quantities makes it possible afterwards to define the velocity and direction of the wind, for example in the form of the magnitude of the angle of elevation $\theta$ and of the azimuth angle $\alpha$.

Figure 1:
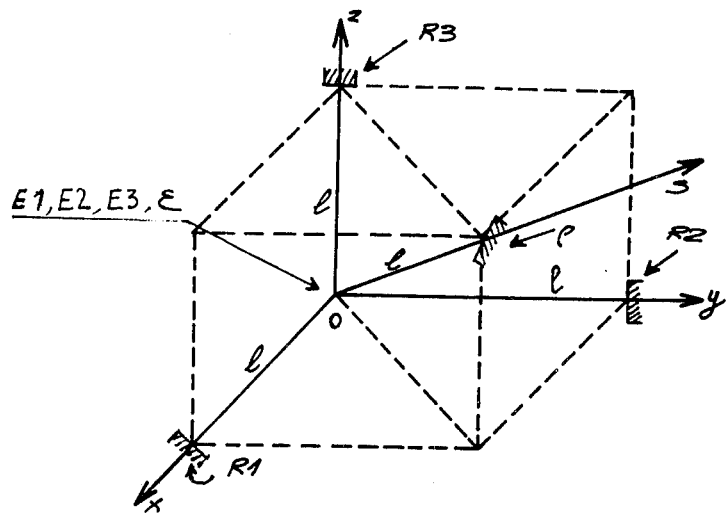
FIG. 1 is a schematic view of a first mode of embodiment of the mechanical framework of the anemometer.

FIG. 1 shows the arrangement in principle in a non-limitative case. As a matter of fact, the three axes of a rectangular tetrahedron are used as the direction of the propagation of acoustic waves. The phase difference between a transmission and a reception for a given distance l between a transmitter and a receiver reads as follows:

$$\phi \overrightarrow{E_1R_1} v + V_x = \frac{-2\pi l}{T} \frac{1}{v + V_x} \quad (1)$$

$$\phi \overrightarrow{E_2R_2} v + V_y = \frac{-2\pi l}{T} \frac{1}{v + V_y} \quad (2)$$

$$\phi \overrightarrow{E_3R_3} v + V_z = \frac{2\pi l}{T} \frac{1}{v + V_z} \quad (3)$$

$$\phi \overrightarrow{\epsilon\rho} v + V_s = \frac{2\pi l}{T} \frac{1}{v + V_s} \quad (4)$$

wherein:

T is the temporal period of the acoustic wave l is the distance between the receivers and transmitters (said distances l may possibly be not equal to one another, but however they are equal in the present non-limitative example)

v is the propagation velocity of the acoustic wave in a medium where the wind speed is zero.

Vx, Vy & Vz being the components of the vector which represents the speed on the three axes of the trihedral OX, OY, OZ.

Vs being the component of the vector which represents the speed along the axis $O_s$.

Accordingly, one has:

$$V_s = (V_x + V_y + V_z)(\sqrt{3}/3) \quad (5)$$

Then, one has a linear system of four equations with four unknown quantities Vx, Vy, Vz and v:

$$v + V_x = K\phi'_1$$

$$v + V_y = K\phi'_2$$

$$v + V_z = K\phi'_3$$

$$v + V_s = K\phi'_4 \quad (6)$$

a system wherein:

$$K = \frac{-2\pi l}{T} \quad (7)$$

$$\phi'_1 = \frac{1}{\phi \overrightarrow{E_1R_1} v + V_x} \quad (8)$$

$$\phi'_2 = \frac{1}{\phi \overrightarrow{E_2R_2} v + V_y} \quad (9)$$

$$\phi'_3 = \frac{1}{\phi \overrightarrow{E_3R_3} v + V_z} \quad (10)$$

$$\phi'_4 = \frac{1}{\phi \overrightarrow{\epsilon\rho} v + V_s} \quad (11)$$

wherein the quantities $\phi_1$, $\phi_2$, etc. . . . are measured quantities. It is to be noted that measured phase differences are the total phase differeces between the waves transmitted and received in the four directions under consideration.

Figure 2:
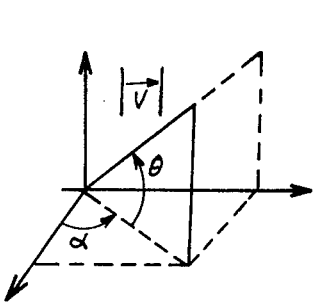
FIG. 2 is a diagram defining the speed and direction of the wind depending on the azimuth angle and the angle of sight.

The resolution of the system (6) makes it possible to calculate Vx, Vy, Vz, as follows:

$$V_x = \frac{K}{\sqrt{3}-1}\left[(\frac{2\sqrt{3}}{3}-1)\phi'_1 - \frac{\sqrt{3}}{3}\phi'_2 - \frac{\sqrt{3}}{3}\phi'_3 + \phi'_4\right] \quad (12)$$

$$V_y = \frac{K}{\sqrt{3}-1}\left[\frac{\sqrt{3}}{3}\phi'_1 + (2\frac{\sqrt{3}}{3}-1)\phi'_2 - \frac{\sqrt{3}}{3}\phi'_3 + \phi'_4\right] \quad (13)$$

$$V_z = \frac{K}{\sqrt{3}-1}\left[\frac{\sqrt{3}}{3}\phi'_1 - \frac{\sqrt{3}}{3}\phi'_2 + (\frac{2\sqrt{3}}{3}-1)\phi'_3 + \phi'_4\right] \quad (14)$$

which permits the speed and direction of the wind to be defined (see FIG. 2):

$$\text{magnitude:} \left|\overrightarrow{V}\right| = \sqrt{V_x^2 + V_y^2 + V_z^2}$$

$$\text{azimuth angle:} = tg \text{ Arc}\left(\frac{V_y}{V_x}\right)$$

$$\text{Angle of elevation: } \theta\, tg \text{ Arc}\left[\frac{V_z}{\sqrt{V_x^2 + V_y^2}}\right]$$

The four pairs of transmitter-receiver piezoelectric transducers are preferably positioned at the periphery of a spherical framework so as to remove aerodynamic problems. Said spherical framework consists of welded tubes made of a material with a low expansion coefficient and particularly of INVAR.

Figure 3:
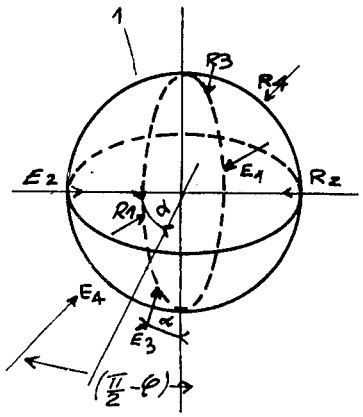
FIG. 3 shows a spherical mode of embodiment of the mechanical framework of the anemometer.

FIG. 3 shows the principle of the device wherein a suitable rotation about the axis of $E_2 R_2$ makes it possible to remain within the limits of three large circles of said sphere. In said non-limitative arrangement, the assemblies $E_1R_1$, $E_2R_2$, $E_3R_3$ are distributed about the axes of a rectangular tetrahedron $E_4R_4$ along the trisectrix of said tetrahedron. Such as made in said non-limitative arrangement, the distances between the transmitter-receiver piezoelectric transducers all are equal.

Figure 4:
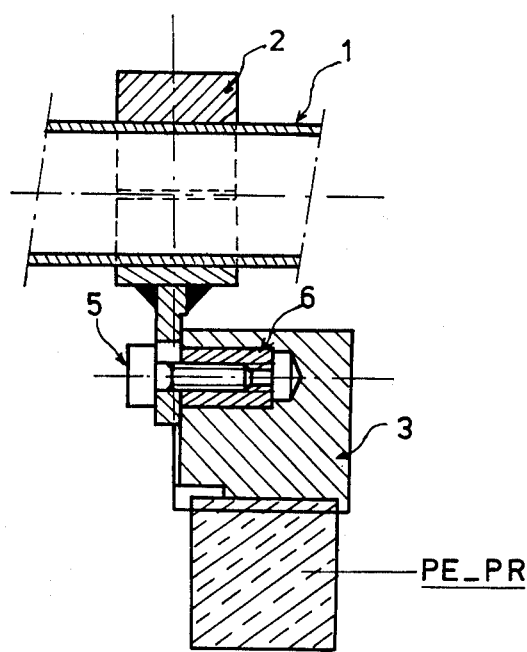
FIG. 4 is a part cross-section view showing the mode of assembly of a transmitter or of a receiver on to the mechanical framework.
Figure 5:
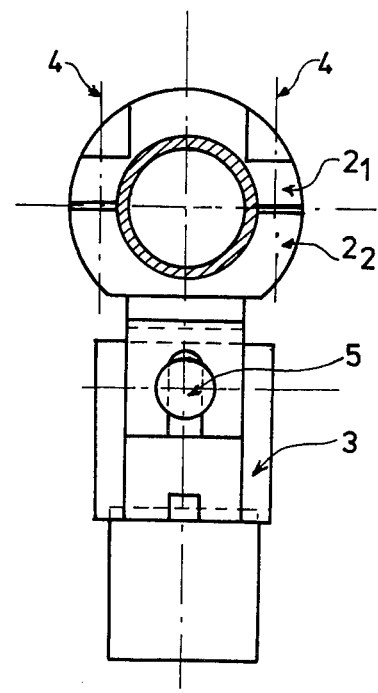
FIG. 5 is a left side view of FIG. 4.

By way of a non-limitative example of a technological mode of embodiment, FIG. 4 shows in detail the attachment of a transducer on to a tube of the framework.

In said example, the tube 1 constituting each of the rings of the spherical framework receives, through a attachment device 2, a shock-absorber block 3 and in particular made of RYTON, said shock-absorber itself receiving the transmitter PE or the receiver PR of a pair of piezoelectric transducers.

The support 2 is achieved in two sections $2_1$, $2_2$ fitted to one another by means of a screw 4, while said shock-absorber 3 is fixed by means of a screw 5 to the support 2 through a ring made of brass.

Figure 6:
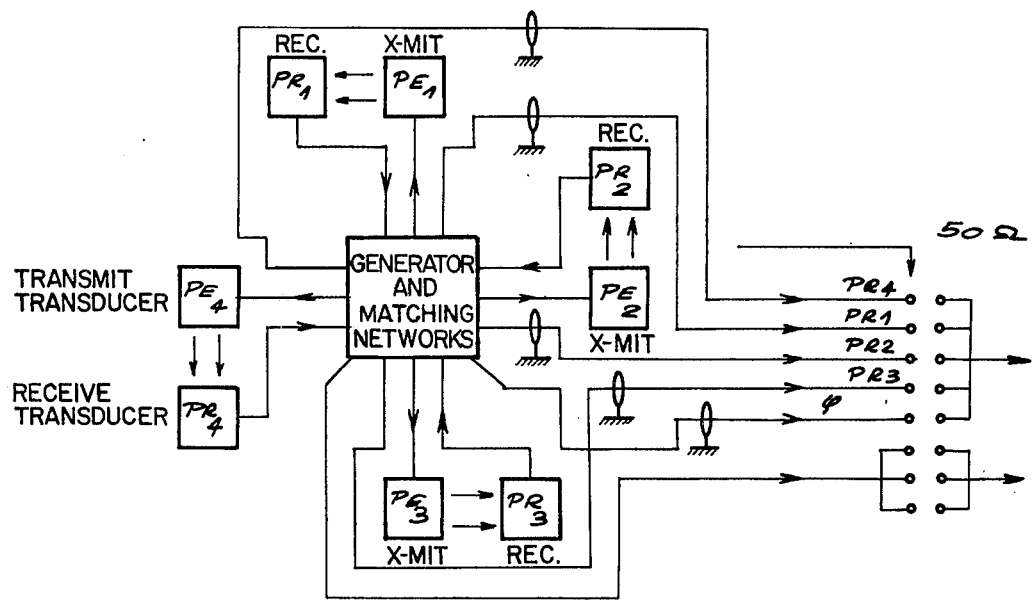
FIG. 6 is a block diagram of the ultrasonic head.

FIG. 6 shows a block diagram of the ultrasonic head described hereabove. The transducers all have identical physical characteristics and are associated by pair to each other ($PE_1$ with $PR_1$, etc. ...). The four transducers PE are assigned to the generation of ultrasonic waves upon stimulation by a suitable electric wave from the generator E, while the four receivers PR are kept in vibration by the supersonic acoustic wave received from the respective transmitter transducer PE positioned opposite each of said four receivers PR.

When vibrating, each transducer PR develops an electric voltage whose impedance is transformed by the impedance matching network A in order to reduce the capacitive effects of the connecting cables. Each transducer PE or PR known in itself is formed from a capsule of piezoelectric ceramic glued on to the internal face of a metallic cup forming a resonator. The resonant frequency of the transducers thus achieved depends on:
- the thickness of the diaphragm of said cup
- the inside diameter of said metallic cup and of the size of the disc of the piezoelectric ceramic. The above parameters should be equal for all the transducers.

Figure 7:
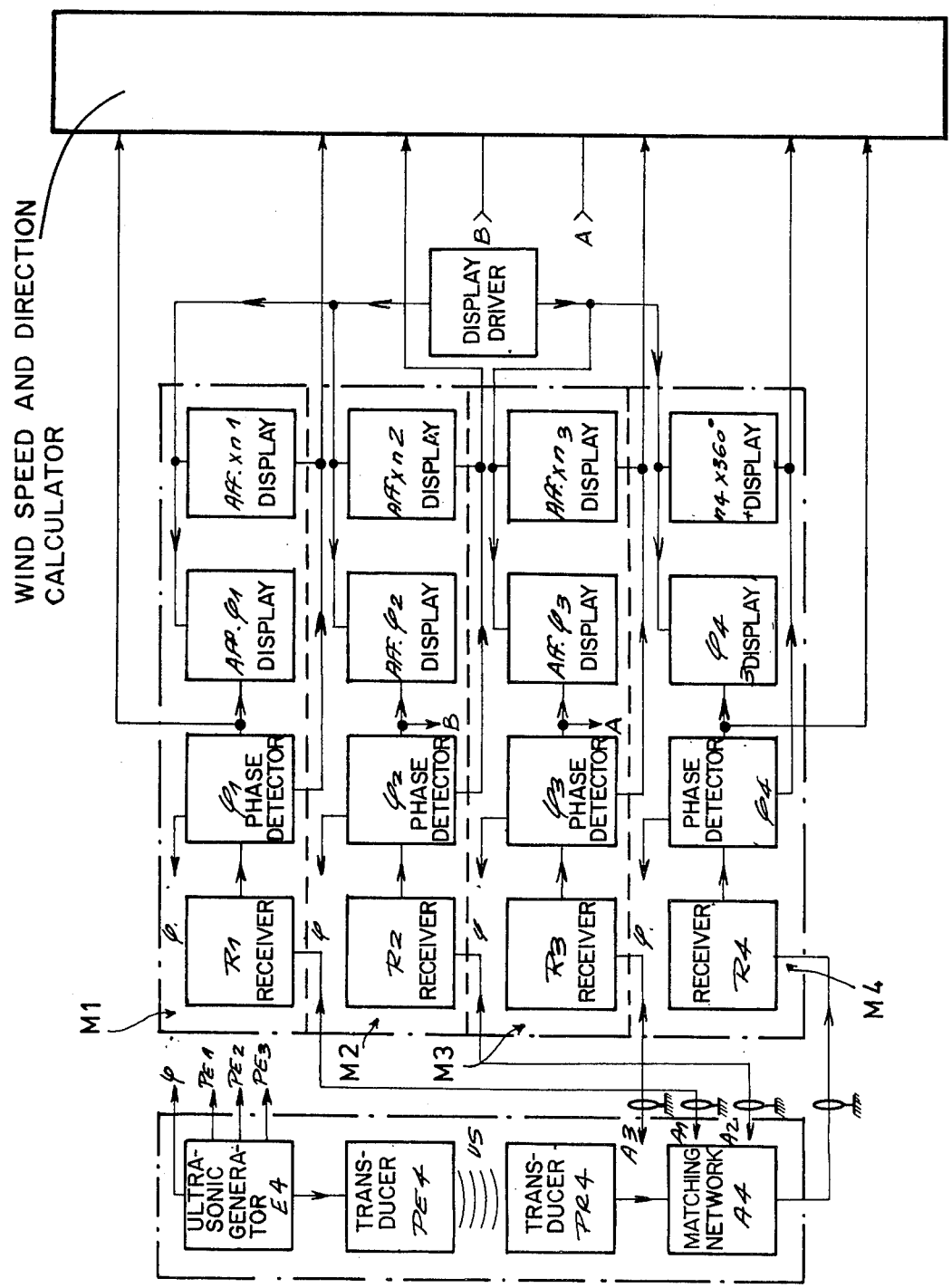
FIG. 7 shows the block diagram of the electronic acquisition system divided into four identical modules.

FIG. 7 shows the diagram block of the electronic acquisition unit divided into four identical modules M1, M2, M3 and M4 each responding to one of the four ultrasonic channels of the measuring head. So as to simplify the drawing, one channel only of said channels V4 has been shown and, in view of the likeness between the electronic modules only one of them will be described (M4).

The receiver R4 receives the low alternating current voltage which develops at the output terminals of the impedance matching network A4. Said voltage is brought up to a suitable level and filtered through the circuits of said receiver. The output signal of said receiver is then transmitted at the outlet of the phasemeter $\Psi_4$ whose purpose is:

(1) to produce an analog voltage proportional to the phase difference up to 360° between the wave of reference $\phi$ref taken from the transmitter E4 and the wave received. (fractional part of said phase difference), (2) to totalize in + or − the number of the entire periods above or below a predetermined reference phase. The results of the measurements of the phases are respectively registered on a 3-digit digital voltimeter thus permitting reading within one degree accuracy, and on a display counter with two decades extending the measurement of the total part of the phase difference to ±99°×360°. The algebraic sum read on the displays assigned to each of the four measurement channels are the quantities $\phi'_1(8)$ to $\phi'_4(11)$ wich will serve as the basis for the calculation of the speed and direction of the wind.

So as to perform a simultaneous measurement on the four measurement channels, a synchronizing block with an adjustable driving means is used.

Of course, the invention is not limited to the modes of embodiment disclosed and depicted hereabove, from which other variations can be provided without thereby departing from the scope of the invention.

What I claim is:

1. An ultrasonic anemometer comprising three pairs of ultrasonic transmitters and receivers, the transmitter and receiver of each pair being spaced apart a predetermined distance along one of three axes having predetermined angles between them, an ultrasonic wave generator electrically coupled to said transmitters and energizing said transmitters to produce acoustic waves, a supporting structure having three intersecting rings defining a sphere, with each of the transmitter-receiver pairs being diametrically opposed to each other on a different one of said rings such that the transmitters and receivers of the three pairs are diametrically opposed to each other on the sphere, a phasemeter coupled to each receiver, and calculating means responsive to signals from said phasemeter for determining wind velocity.

2. An anemometer according to claim 1, wherein the supporting structure is fabricated from a material having a low coefficient of expansion.

3. An anemometer according to claim 1, wherein the transmitters and receivers of the pairs are affixed to the supporting structure through a block made of a shock-absorber material.

4. An anemometer according to claim 1 further including display means and means including a synchronizing block coupling said display means to said transducers.

5. An anemometer as recited in claim 1 wherein each of said receivers is coupled to said calculating means via an impedance matching network and each of said phasemeters includes a display.

6. An anemometer according to claim 1 further including means for removing the influences of variations in temperatures and other physical parameters, said variation removing means including a fourth transmitter-receiver pair and means for supporting the transmitter and receiver of the fourth transmitter-receiver pair diametrically opposed to each other along the sphere defined by said rings and in spaced relationship with the other transmitter-receiver pairs.

7. An anemometer according to claim 1 wherein said rings are mutually perpendicular.

8. An ultrasonic anemometer comprising three transmitter-receiver pairs, the transmitter and receiver of each pair being spaced apart along one of three mutually perpendicular axes, an ultrasonic wave generator electrically coupled to said transmitter and energizing said transmitter to produce acoustic waves, a supporting structure supporting said transmitter-receiver pairs so that said transmitter-receiver pairs define a rectangular tetrahedron, a phasemeter coupled to each receiver, and calculating means responsive to signals from said phasemeter for determining wind velocity.

9. An anemometer according to claim 8, wherein so as to remove the influence of the variations in temperature and other physical parameters, said anemometer includes a fourth transmitter-receiver pair.

10. An ultrasonic anemometer as recited in claim 9 wherein one of said transmitters and receivers of said fourth transmitter-receiver pair is located at the intersection of the three planes defining said rectangular tetrahedron.

11. An anemometer according to claim 8, wherein the supporting structure is fabricated from a material having a low coefficient of expansion.

12. An anemometer according to claim 8, wherein the transmitters and receivers of the pairs are affixed to the supporting structure through a block made of a shock-absorber material.

13. An anemometer according to claim 8 further including display means and means including a synchronizing block coupling said display means to said transducers.

14. An anemometer as recited in claim 8 wherein each of said receivers is coupled to said calculating means via an impedance matching network and each of said phasemeters includes a display.

* * * * *